Patented Aug. 28, 1928.

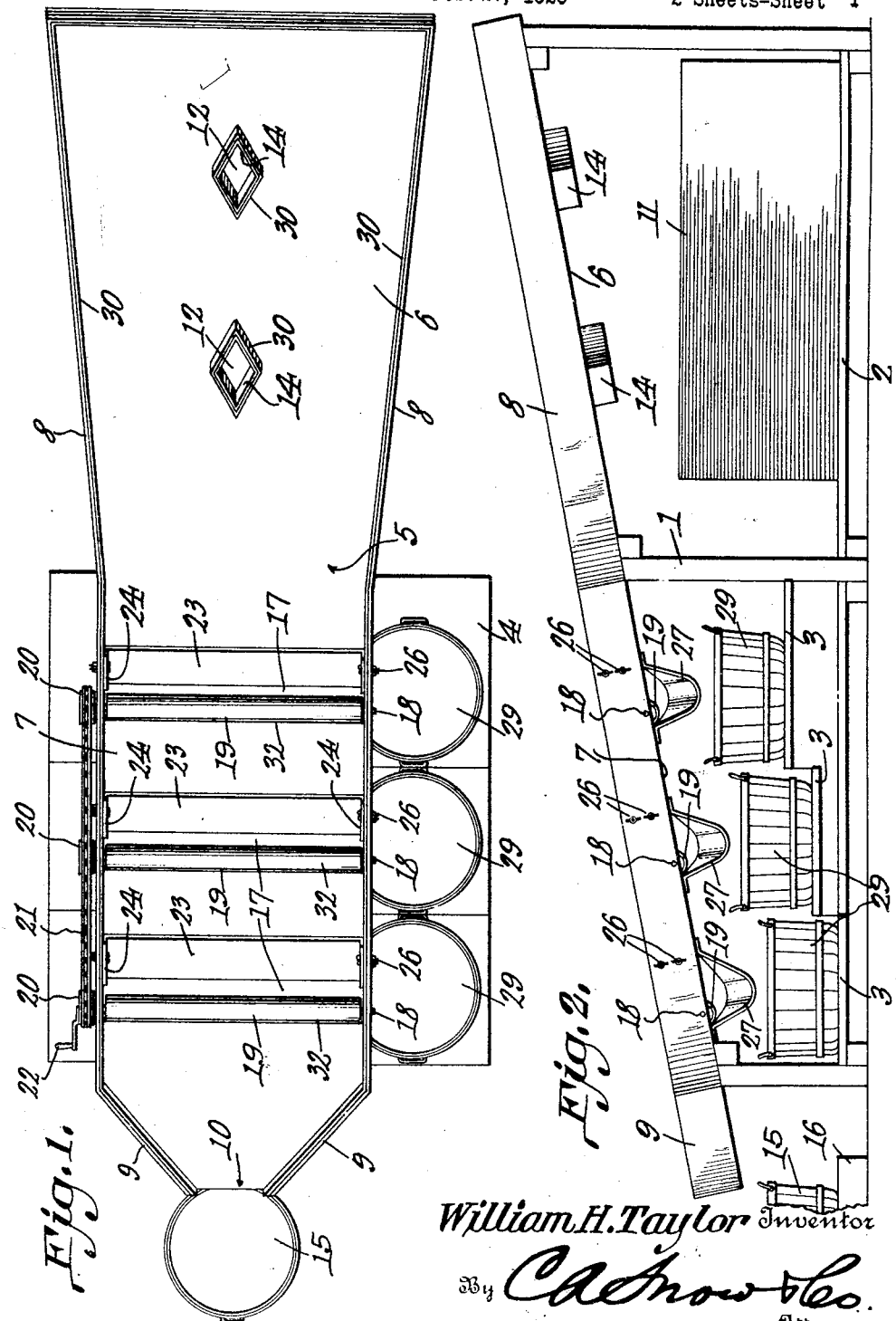

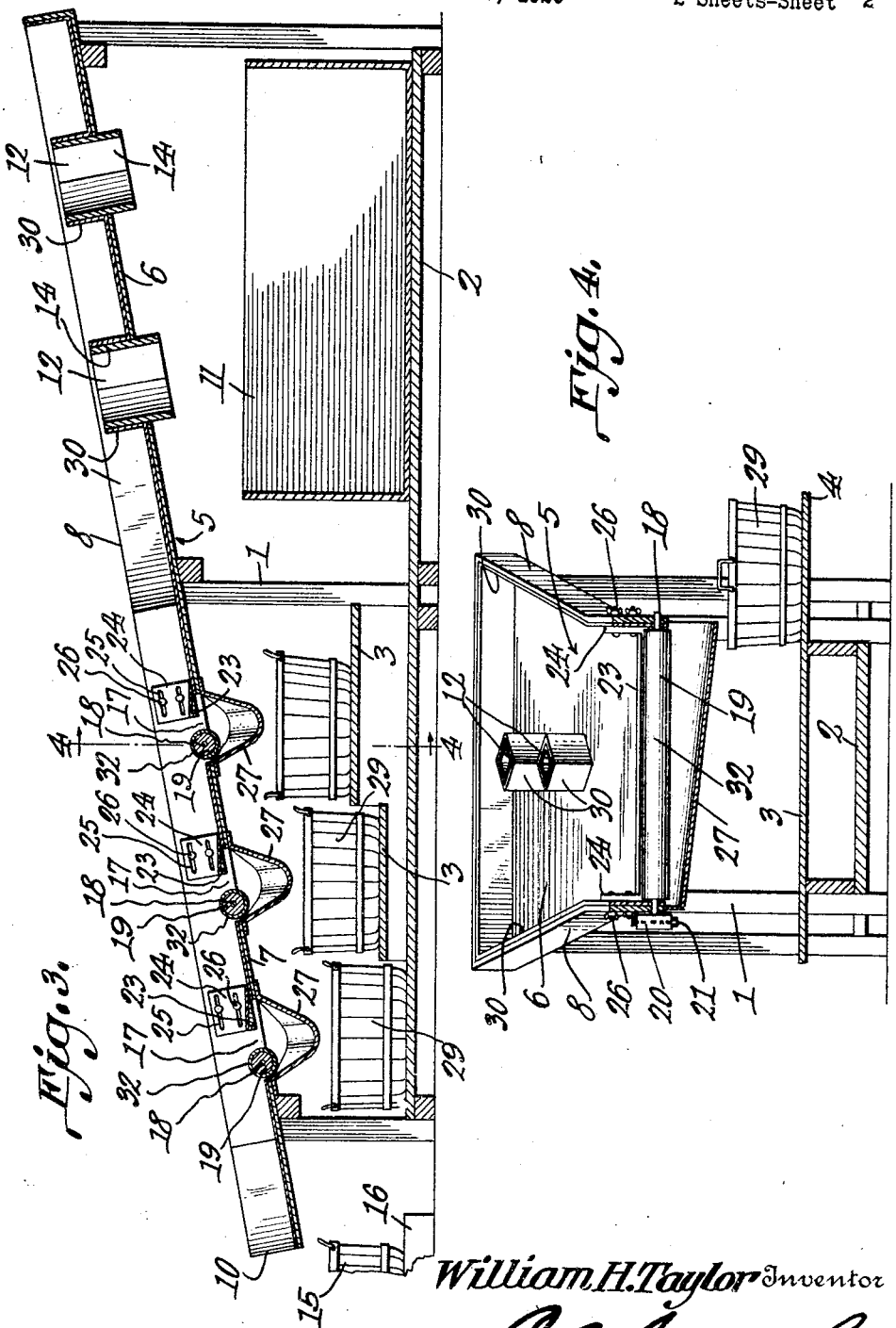

1,682,054

UNITED STATES PATENT OFFICE.

WILLIAM H. TAYLOR, OF ANNA, ILLINOIS.

PEACH-SIZING MACHINE.

Application filed February 27, 1926. Serial No. 91,180.

This invention aims to provide novel means whereby peaches and other fruit may be sized rapidly and accurately.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1 shows in top plan, a device constructed in accordance with the invention;

Figure 2 is a side elevation;

Figure 3 is a longitudinal section;

Figure 4 is a section taken about on the line 4—4 of Figure 3.

The device forming the subject matter of this application comprises a frame 1, of any desired construction, the frame carrying a main platform 2, and auxiliary platforms 3, the platforms 3 being stepped downwardly, longitudinally of the machine, and being extended laterally, as at 4, beyond the frame 1.

The frame 1 carries an inclined runway which, as a whole, is denoted by the numeral 5, the runway embodying a sorting table 6 which forms the upper end of the runway, and a sizing deck which forms the lower end of the runway, the sorting table and the deck preferably being located in the same inclined plane. Saving at its lower end, the runway 5 is surrounded by a rim 8, the ends of which converge, as at 9, to form, at the lower end of the sizing deck 7, a reduced outlet 10, through which the fruit which passes all of the sizing means (hereinafter described) is discharged into a basket 15, or other receptacle, mounted on any kind of a support 16, should a support be considered necessary.

The fruit is placed on the sorting table 6 and rolls downwardly along the sorting table. Operators, standing on one or both sides of the sorting table 6, pick out the culls and drop them through openings 12 in the table 6, the culls passing into a receptacle 11 on the main platform 2. The openings 12 are surrounded by sleeves 14, so that no fruit can find its way into the openings 12, saving alone the fruit which the operators pick up and drop through the openings 12.

The sizing deck 7 has transverse openings 17 which are spaced apart lengthwise of the deck. Shafts 18 are journaled in the rim 8 and carry rollers 19 located at the forward edges of the openings 17. There are pulleys 20 on the shafts 18 the pulleys being engaged by a belt 21, and one pulley having a crank 22. Gates 23 are mounted for sliding adjustment on the sizing deck 7 at the upper ends of the openings 17. The gates 23 have upstanding end wings 24 supplied with longitudinal slots 25 receiving securing elements 26, such as bolts and wing nuts, carried by the rim 8, the construction being such that the gates 23 may be shifted lengthwise of the sizing deck 7 to vary the effective area of the openings 17 and to regulate the size of fruit which passes through each opening. The gates slant upwardly and forwardly, so as to ease the fruit onto the rollers 18, and when the rollers are turned by means of the pulleys 20, the belt 21 and the crank 22, the fruit, of different sizes, passes downwardly into transverse chutes 27 that are secured to the deck 7, the bottom of each chute being inclined downwardly and outwardly, as shown in Figure 4, so as to discharge the sorted fruit into baskets 29 on the extensions 4 of the platforms 3. The fruit which is too big to pass through any of the openings 17, leaves by way of the outlet 10. The runway 25 and the sleeves 14 may be provided with a covering 30, of rubber or the like, to prevent bruising the fruit, and the rollers 18 may be supplied with a similar covering, as indicated at 32. It is suggested that, with a view to avoiding a bruising of the fruit, the chutes 27 be made of canvas or some equivalent material. By loosening the securing elements 26, the gates 23 may be shifted lengthwise of the sizing deck 7 to vary the size of the openings at the rear of the rollers 18, and, consequently, to regulate the size of the fruit which is sized at each of the openings 17.

What is claimed is:—

In a fruit-sizing machine, an inclined sizing deck having an opening, a sizing roller journaled at the lower edge of the opening, means for rotating the roller, a gate on the deck at the upper edge of the opening, the gate being spaced from all portions of the roller and being inclined upwardly from the deck toward the upper portion of the surface of the roller, there being an unincumbered opening between the gate and the roller, the gate cooperating with the roller to vary the effective size of the opening, and means for holding all portions of the gate fixedly in adjusted positions and in spaced relation to the roller at all times.

In testimony that I claim the foregoing as my own, I have hereto affixed my signature.

WILLIAM H. TAYLOR.